G. P. HAYNES.
CONTROL ATTACHMENT FOR SCRAPERS.
APPLICATION FILED FEB. 7, 1921.
1,418,567.
Patented June 6, 1922.
Fig. 1
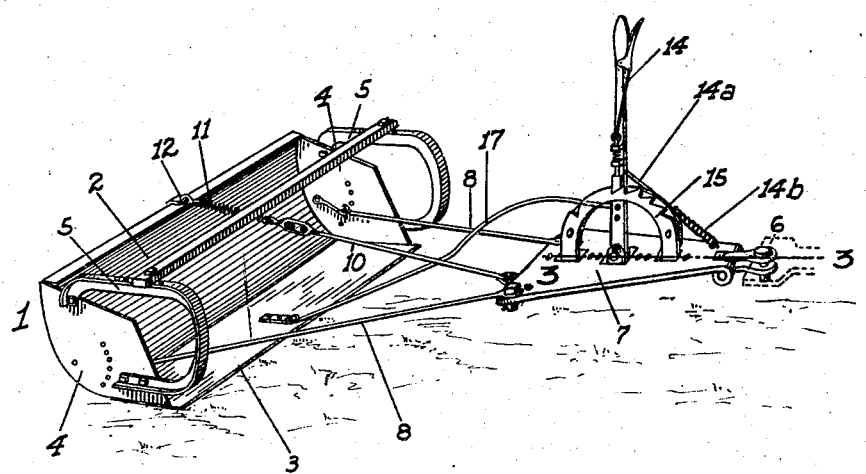
Fig. 2
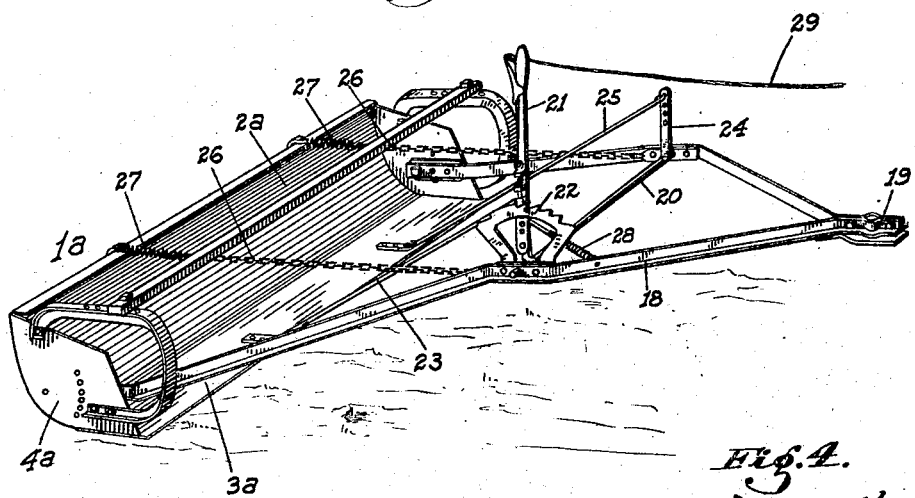
Fig. 3
Fig. 4
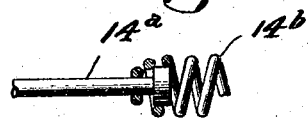
INVENTOR.
George P. Haynes
BY
ATTORNEY

UNITED STATES PATENT OFFICE.

GEORGE P. HAYNES, OF TRACY, CALIFORNIA.

CONTROL ATTACHMENT FOR SCRAPERS.

1,418,567.

Specification of Letters Patent.   Patented June 6, 1922.

Application filed February 7, 1921.   Serial No. 442,956.

*To all whom it may conern:*

Be it known that I, GEORGE P. HAYNES, a citizen of the United States of America, residing at Tracy, county of San Joaquin, State of California, have invented certain new and useful Improvements in Control Attachments for Scrapers; and I do declare the following to be a full, clear, and exact description of the same, reference being had to the accompanying drawings, and to the characters of reference marked thereon, which form a part of this application.

This invention relates to improvements in agricultural implements, and particularly to the scrapers used in leveling, checking and similar operations.

The principal object of my invention is to provide a scraper of the well-known "Fresno" type with means whereby it may be easily drawn by a tractor and its various settings and movements controlled by the driver of the tractor from his seat thereon without the necessity of an extra operator following along behind the scraper, as must be done with this form of scraper as ordinarily manufactured.

Another object is to so form the control means that it is actually an independent unit in itself and does not need to be made with the scraper.

At the same time, it may readily be connected up to any scraper of the type mentioned with but very few alterations or additions being necessary to the scraper.

The device may also be made in different sizes, working on the same principle, but adapted for connection to different sized scrapers.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a perspective elevation of a scraper with my control attachment shown in connection therewith, this attachment being the design preferably chosen for relatively small scrapers.

Fig. 2 is a similar view, showing the style of attachment preferably used with extra long or wide scrapers.

Fig. 3 is a side elevation of a bracket member for the style of attachment shown in Fig. 1.

Fig. 4 is an enlarged fragmentary view showing a lever spring-and-rod connection.

Referring now more particularly to the characters of reference on the drawings, and especially at this time to the form of construction embodied in Figs. 1 and 3, the numeral 1 denotes the scraper, which comprises as usual a back plate 2, a blade or scraping portion 3, side plates 4 and runners 5. The numeral 6 represents the drawbar of a tractor positioned a suitable distance ahead of the scraper, to which is pivotally mounted a platform or bracket 7 extending rearwardly thereof and flaring out at the sides toward the rear ends. From the rear corners of this bracket pull-rods 8 extend to pivotal connections with the side plates 4, the usual rod members provided with the scraper being utilized for the purpose, and their connections with the bracket being practically in the plane of a straight line drawn through the drawbar and scraper-plate connections, both vertically and horizontally.

Positioned centrally of the width of the bracket and preferably under the same is a rod 9 (see Fig. 3) to which is attached one end of a rod 10 which extends rearwardly to a fairly strong coil spring 11, which is connected to the back plate 2 of the scraper centrally of the width thereof by means of a strap 12 fixed thereon, both rod and spring being capable of adjustment.

Mounted on the rod 9 for longitudinal movement as shown at 13, is a lever 14, having a pawl mechanism co-operating with and held in a definite vertical plane by a notched quadrant or comb 15, which is mounted on the rod 9, as shown at 16. Both the lever and quadrant are swivelly and adjustably mounted on the rod so that their vertical plane of setting may be altered. By reason of this construction, the lever and comb may be shifted transversely to have any desired angle with respect to a longitudinal vertical plane so that the lever handle may be to one side or the other of the longitudinal center line of the tractor and scraper, and the handle may thus be reached from either side of the tractor seat, as may be desired by the operator.

A link-rod 14ª extends forwardly of the lever therefrom, and makes connection with one end of a spring 14ᵇ in such a manner that with a rearward movement of the lever, the spring is thrown in tension, but with a forward movement thereof beyond a certain point, the rod slips through the spring and the latter is slack.

A rod 17 extends from the lever 14 above its fulcrum to the scraping plate 3 centrally of the width thereof.

The form of the device shown in Fig. 2 is constructed on exactly the same principle as that just described, but is more suitable for large width scrapers as previously stated.

In this design the platform 7 is eliminated, and replaced by a substantially triangular and rigid frame 18, preferably of structural iron, which extends from a pivotal connection with the side plates 4ª of the scraper 1ª to the drawbar of the tractor, the frame having a clevis 19 or similar member at its forward end to adapt it for connection to said drawbar.

Mounted transversely on the frame substantially central of its length is a shaft 20, on one end of which is fixed a lever 21 engaging a notched quadrant 22 fixed to the frame 18, from which lever above its fulcrum-shaft a rod 23 extends to the scraping plate 3ª adjacent the outer end thereof. From the opposite end of the shaft 20 an arm 24 projects upwardly therefrom, parallel to the lever 21, and whose height is equal to the distance from the shaft to the connection of the rod 23 with the lever. From the upper end of the arm 24 a rod 25 also extends to the scraper plate 3ª, it being understood that these rods are spaced equally on opposite sides of the longitudinal center line of the scraper and frame, the latter being symmetrical.

From the back plate 2ª of the scraper, chains 26 having coil springs 27 interposed therein extend to the frame 18, preferably connected therewith adjacent the shaft 20. To aid in the operation of the lever, a spring 28 is connected thereto and to the frame 18 ahead of said lever.

The advantages of this type of construction for large scrapers over the type first described are that it prevents lateral twisting of the scraper, and divides the strains more evenly from one end or side of the scraper to the other.

In this latter form, the lever is not adjustable laterally, being permanently set to either one side or the other of a central plane, and a rope 29 may be attached to the pawl-operating trigger of the lever and extending ahead to the tractor in the event that the latter is too far ahead for the lever to be within convenient reach.

The operation and functioning of both forms of the device is identical.

Referring to Fig. 1, the scraper is turnable on an axis fixed a certain distance from the bracket by reason of the rods 8.

The spring 11 on the rod 10 is constantly in tension and acts to cause the edge of the scraping blade to bite into the ground. This tendency is controlled and restrained by the lever-rod 17. When the lever is moved forwardly, the scraper is turned about its axis, and may be set at a number of positions, from scraping to carrying the load scraped, the scraping edge being raised from the ground, in which position it may be held indefinitely by the engagement of the lever-pawl and quadrant. By reversing the lever so as to ease up on the rod, the pull of the spring 11, aided by the natural tilting tendency of the scraper caused by its contact with the ground and the forward movement of the tractor, causes the scraper to upset and ride on the runners 5 to dump, the extent to which this movement may take place depending on the freedom of movement allowed the rod.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. A control attachment for ground-bearing scrapers comprising a platform secured ahead of the scraper and supported from the ground, the side plates of the scraper being pivotally connected therewith, a flexible member fixed to and extending from the platform to the back plate of the scraper, and means actuated by a single lever mounted on the platform and connected to the scraper for controlling the movement of the latter in either direction about the pivotal connection of the platform with the scraper as an axis.

2. A control attachment for ground-bearing scrapers comprising a platform secured ahead of the scraper and supported from the ground, the side plates of the scraper being pivotally connected therewith, a flexible member extending from the platform to the back plate of the scraper, and another member connected to the bottom scraping plate of the scraper, and arranged to be moved longitudinally of the scraper to control the turning movement of the latter.

3. A control attachment for ground-bearing scrapers comprising a platform secured ahead of the scraper and supported from the ground, the side plates of the scraper being pivotally connected therewith, a flexible member extending from the platform to the back plate of the scraper, another member connected to the bottom scraping plate of the scraper, and lever means on the platform connected to the last named member, whereby the turning movement of the scraper may be controlled by the movement of said lever.

4. A control attachment for ground-bearing scrapers, comprising a platform secured ahead of the scraper and supported from the ground, the side plates of the scraper being pivotally connected therewith, a flexible member extending from the platform to the back plate of the scraper, a spring interposed in said member normally in tension and tending to cause the scraper to tilt forwardly, and hand actuated means operatively connected to the scraper to control the turning movement of the latter.

5. In a scraper, a lever and quadrant mechanism for controlling the movements of the same, said mechanism being adapted to be set at different angles with respect to the longitudinal vertical plane of the line of travel of the scraper.

6. In a scraper, a lever and quadrant mechanism for controlling the movement of the same, and means whereby said mechanism may be set and held at any desired transverse angle with respect to the scraper.

7. In a scraper, a lever and quadrant mechanism for controlling the movements of the same and a rod extending longitudinally of the line of movement of the scraper the lever and quadrant being turnably and adjustably mounted thereon.

In testimony whereof I affix my signature.

GEORGE P. HAYNES.